United States Patent
Schramm et al.

(10) Patent No.: US 8,230,956 B2
(45) Date of Patent: Jul. 31, 2012

(54) ARRANGEMENT OF AN ELECTRICAL MACHINE

(75) Inventors: Hendrik Schramm, Ingolstadt (DE); Csaba Bencso, Sopron (HU)

(73) Assignee: Audi, AG, Ingolstadt (DE)

( * ) Notice: Subject to any disclaimer, the term of this patent is extended or adjusted under 35 U.S.C. 154(b) by 935 days.

(21) Appl. No.: 12/091,443

(22) PCT Filed: Oct. 20, 2006

(86) PCT No.: PCT/EP2006/010118
§ 371 (c)(1),
(2), (4) Date: Apr. 24, 2008

(87) PCT Pub. No.: WO2007/048542
PCT Pub. Date: May 3, 2007

(65) Prior Publication Data
US 2011/0114396 A1    May 19, 2011

(51) Int. Cl.
*B60K 6/20* (2007.10)
(52) U.S. Cl. ............................. 180/65.6; 180/378; 475/5
(58) Field of Classification Search ............... 180/65.21, 180/65.6, 233, 376, 377, 378; 475/5
See application file for complete search history.

(56) References Cited

U.S. PATENT DOCUMENTS

| 4,817,753 | A | * | 4/1989 | Hiketa | 180/249 |
| 6,158,303 | A | * | 12/2000 | Shiraishi et al. | 74/665 T |
| 6,533,665 | B2 | * | 3/2003 | Peinemann et al. | 464/68.5 |
| 7,445,573 | B2 | * | 11/2008 | Grumbach et al. | 475/5 |
| 7,677,349 | B2 | * | 3/2010 | Markl | 180/251 |

FOREIGN PATENT DOCUMENTS

| DE | 4436383 A1 | 4/1995 |
| DE | 10152476 A1 | 5/2003 |
| EP | 0727332 A | 8/1996 |
| EP | 1160119 A | 12/2001 |

* cited by examiner

*Primary Examiner* — John Walters
(74) *Attorney, Agent, or Firm* — Novak Druce + Quigg LLP

(57) ABSTRACT

A drive train for a vehicle provided with an internal combustion engine including a first housing mounted on said engine, a second housing mounted in said first housing, a transmission mounted on the second housing operatively connected to the engine, a transversely disposed shaft disposed in the first housing drivingly connected to the transmission, an electrical motor disposed in one of the housings and operating interconnecting the engine and transmission and a clutch operatively interconnecting a rotor of the electric motor and the transmission.

6 Claims, 2 Drawing Sheets

ARRANGEMENT OF AN ELECTRICAL MACHINE

CROSS-REFERENCE TO RELATED APPLICATIONS

This application is a 35 U.S.C. 371 National Stage of PCT/SE2006/010118 filed on Oct. 20, 2006, which claims priority from German Patent Application Nos. 019837.9 filed on Apr. 28, 2006 and German Patent Application No. 051251.8 filed Oct. 26, 2005, the entire disclosures of which are hereby incorporated by reference.

The invention relates to an arrangement of an electrical machine between the power delivery shaft of an internal combustion engine and a speed-change transmission for motor vehicles according to the preamble of claim 1.

BACKGROUND OF THE INVENTION

An arrangement such as this is described by DE 101 52 476 A1 in which the electrical machine is designed as a starter-generator device; but the electrical machine can also drive the motor vehicle in addition or independently in a hybrid propulsion device. Since the electrical machine is connected downstream from the internal combustion engine in an arrangement in a motor vehicle, in conjunction with a likewise necessary starting element, construction problems can arise, especially for a front-side drive unit of a motor vehicle with front-wheel drive or a front axle differential.

The object of the invention is to propose an arrangement of the generic type which is made structurally especially compact and which enables a favorable distribution of the axle weight of the motor vehicle especially for front-wheel drive or all-wheel drive.

SUMMARY OF THE INVENTION

It is proposed according to the invention that there is an intermediate shaft between the power delivery shaft of the internal combustion engine and the rotor of the electrical machine and that within the axial distance which has been formed in this way, the output shaft of the differential is positioned for driving a wheel of the motor vehicle, which output shaft runs transversely to the drive axis of rotation. This arrangement makes it possible, for example in front-wheel drive of the motor vehicle, to shift the internal combustion engine, with a location which is also determined by the positioning of the front axle differential, farther to the rear, with a corresponding favorable distribution of the axle weight. Furthermore, mechanical and structural constraints can be corrected by the structural compactness which is otherwise present in the arrangement of the electrical machine and the adjacent starting element, for example, a disconnect-type clutch and/or a torque converter.

In a structurally especially compact arrangement the starting element with the rotor of the electrical machine can be assembled into a unit and integrated into the housing of the transmission. It goes without saying that the housing must be adapted and if necessary widened accordingly.

Furthermore the intermediate shaft and the output shaft of the differential can be located in an intermediate housing on which the differential gear is laterally mounted. This results in simplified production of the components to form premounted units which can then be assembled with the internal combustion engine to form a drive unit.

For this purpose, in a further simplification of installation, the rotor of the electrical machine can be journaled in the transverse wall of the transmission and can be connected via a plug connection to the intermediate shaft in such a way as to transfer torque.

Furthermore, the intermediate shaft can be securely connected to the power delivery shaft of the internal combustion engine or can be made integrally with it and thus can likewise form a preassembly unit with the internal combustion engine.

In an alternative configuration of the invention, a torsional vibration damper can be connected between the power delivery shaft of the internal combustion engine and the intermediate shaft. The torsional vibration damper can, in particular, be a dual mass flywheel (ZMS), with a primary mass attached to the power delivery shaft, which is coupled to the intermediate shaft via damping means and a disk-shaped driver part. Alternatively the ZMS can also be connected between the intermediate shaft and the rotor of the electrical machine. This results in that the rotor of the electrical machine and the downstream starting element are advantageously used as the secondary mass of the ZMS.

Furthermore, the disconnect-type clutch which is used as a starting element, for example a single-disk, dry friction clutch of known design, can be assembled with the rotor of the device to form a unit in a structurally especially advantageous manner, the disconnect-type clutch being able to lie at least partially radially within the rotor.

The ring-shaped rotor here can preferably be located around a cup-shaped drive part which moreover forms the pressure plate of the disconnect-type clutch.

The intermediate shaft can be connected securely to the cup-shaped drive part to facilitate installation and, to be driven, can correspond with the primary mass of the ZMS via a plug connection.

Furthermore, the intermediate shaft can be journaled especially advantageously in an intermediate wall section which is attached to the housing of the transmission and thus can ensure durable and vibration-resistant support of the rotor with the integrated disconnect-type clutch.

The intermediate wall section can be interrupted at least in the region of the transversely running output shaft, that is, can potentially be made only above the output shaft and can carry a bearing, especially an antifriction bearing, for the intermediate shaft.

Finally, the input shaft of the transmission can be journaled in the cup-shaped drive part and/or in the intermediate shaft.

BRIEF DESCRIPTION OF THE DRAWINGS

Two embodiments of the invention will be explained below with further details. The drawings are roughly schematic.

DETAILED DESCRIPTION OF PREFERRED EMBODIMENTS OF THE INVENTION

Figure 1:
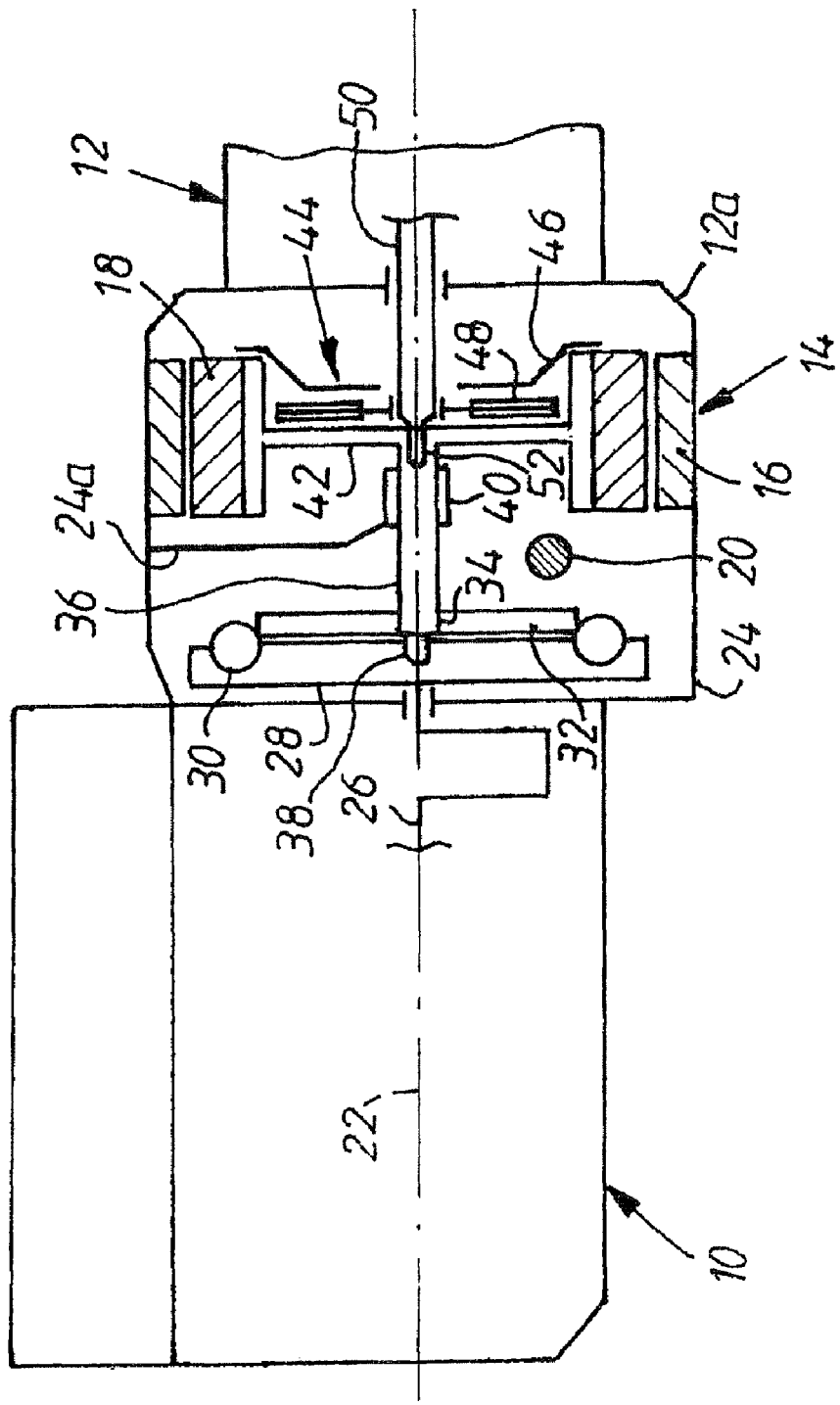
FIG. 1 shows in a side view an arrangement of an electrical machine with a disconnect-type clutch and a split dual mass flywheel (ZMS) between the power delivery shaft of the internal combustion engine and a speed-change transmission for motor vehicles.

The drive arrangement shown as a block diagram in FIG. 1 has an internal combustion engine 10, a downstream, only partially outlined speed-change transmission 12, and as the electrical machine a starter-generator device 14 with a ring-shaped stator 16 and a ring-shaped rotor 18. The indicated components are of conventional design for motor vehicles to the extent not described; thus the transmission 12 can be a manual transmission or an automatic transmission, the device 14 can be any type of electrical machine, for example an electrical asynchronous three-phase machine by means of which the internal combustion engine 10 is started and the vehicle can be driven in hybrid drive.

A differential is laterally mounted on to the transmission 12 in a manner which is not visible in FIG. 1; the output shaft 20 of the differential underneath the axis of rotation 22 of the drive arrangement 10, 12, 14 and running transversely or crossing the axis of rotation 22 is routed through the housing 24 (clutch housing) which is located between the internal combustion engine 10 and the transmission 12 and drives one wheel of the vehicle (for front-wheel or all-wheel drive) via a continuing universal joint propeller shaft.

A torsional vibration damper or a dual mass flywheel (ZMS) is flanged to the power delivery shaft or crankshaft 26 of the internal combustion engine 10 and is composed of a disk-shaped primary mass 28, a damping means 30 which is formed by a spring assembly, and a secondary mass still to be described. The primary mass 28 and the damping means 30 can be made in the design which is known for ZMS.

A disk-shaped driver 32 engages the damping means 30 in the conventional manner and, viewed in the direction of rotation, is coupled to the primary mass 28 by way of the damping means 30 and is drive-connected to the intermediate shaft 36 by way of a plug connection 34 with the corresponding plug teeth.

The intermediate shaft 36 is furthermore journaled by way of a rotationally symmetrical journal 38 which has been mounted in a corresponding bearing hole (without reference numeral) in the disk-shaped primary mass 28.

The intermediate shaft 36 which is moreover journaled in an antifriction bearing 40 in the intermediate wall 24a of the housing 24, said wall being made only in sections and above the output shaft 20, is securely connected to a cup-shaped, rotationally symmetrical drive part 42 with the rotor 18 of the device 14 mounted on its outer periphery.

Within the cup-shaped drive part 42 there is a single-disk, dry friction clutch or disconnect-type clutch 44 of conventional design which is only outlined and which is provided, as the starting element, with a clutch cover 46 which is screwed to the drive part 42 and with a driver plate 48 which is positioned in between and which is in turn drive-connected nonrotatably by way of a plug connection to the input shaft 50 of the transmission 12.

In addition, the input shaft 50 is journaled in the drive part 42 by way of a bearing site 52. The driver plate 48 of the clutch 44 is pressed by means of a pressing device which is not shown directly against the drive part 42 which is used as the base plate of the clutch 44. The actuating means of the clutch 44 is not shown and can be of conventional design.

The stator 16 of the starter-generator device 14 is integral to the housing 24 and is connected to the electrical system of the motor vehicle and to the corresponding electronic control. When the transmission 12 has been shifted into neutral and/or when the disconnect-type clutch 44 has been opened, the internal combustion engine 10 here can be started by current being supplied to the device 14, and later, with the internal combustion engine 10 running, it can be connected as a generator for power generation. Furthermore, optionally by way of the device 14 in a hybrid drive design the vehicle in addition to the internal combustion engine 10 can be electrically driven.

Based on the described arrangement, the driver 32, the intermediate shaft 36, the drive part 42 with the rotor 18 and with the integrated clutch 44 form the secondary mass of the ZMS which is coupled to the primary mass 28 damped against torsional vibrations by way of the damping means 30.

The length of the intermediate shaft 35, as is apparent, is dimensioned such that there is the required free space for the transversely running output shaft 20.

Figure 2:
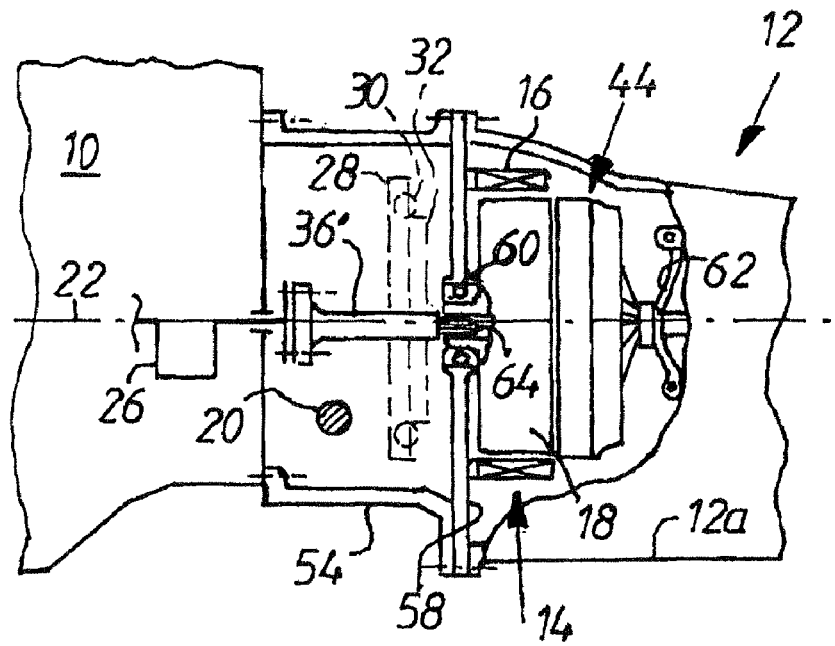
FIG. 2 shows an alternative arrangement as shown in FIG. 1, but without a dual mass flywheel as the torsional vibration damping means on the power delivery shaft of the internal combustion engine.
Figure 3:
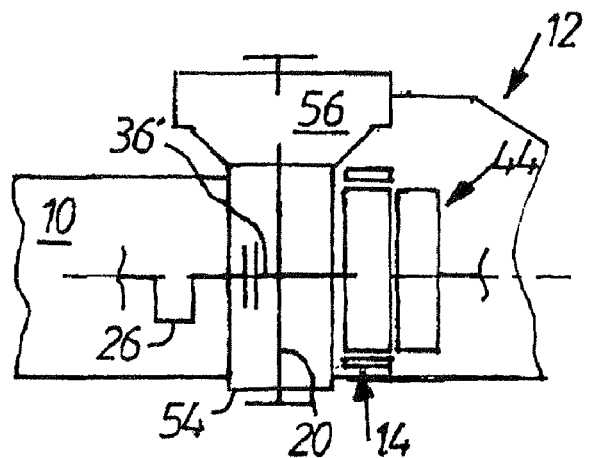
FIG. 3 shows a roughly schematic top view of the arrangement as shown in FIG. 2.

FIGS. 2 and 3 show another version of the invention which is described only to the extent in which it differs significantly from FIG. 1. Functionally identical parts are provided with the same reference numerals.

The intermediate shaft 36' here is directly connected to the power delivery shaft 26 of the internal combustion engine 10 (for example by a flange connection) or is molded directed to it, and extends through a separate intermediate housing 54 which is located between the internal combustion engine 10 and the transmission 12.

The output shaft 20 of the front axle differential 56 (cf. FIG. 3) extends underneath the intermediate shaft 36' running transversely thereto; the differential is mounted laterally on the intermediate housing 54 and as is apparent, in its longitudinal extension can project over the housing of the internal combustion engine 10 and of the transmission 12. The internal combustion engine 10 and the transmission 12 can thus be placed relatively close proximity to one another.

The electrical machine 14 with its stator 16 and the rotor 18 is located within the housing 12a of the transmission 12 behind an input-side transverse wall 58, the rotor 18 in the transverse wall 58 being journaled in an antifriction bearing 60 and in a manner which is not detailed bears the disconnect-type clutch 44 as the starting element in a unit. The clutch actuation 52 which is only outlined is likewise integrated in the transmission 12.

The transverse wall 58 is made as a separate intermediate wall for a simplification of the installation of the transmission 12 with the electrical machine 14 and the disconnect-type clutch 44 and is positioned and attached in the flange region between the intermediate housing 54 and the housing 12a of the transmission 12.

The intermediate shaft 36' is nonrotatably connected to the rotor 18 of the electrical machine 14 by way of a plug connection which is generally designated as 64.

The invention is not limited to the illustrated embodiments. Thus, instead of the described disconnect-type clutch 44, a double clutch, a hydraulically actuated multiple-disk clutch, etc., can also be used, depending on the type of transmission. The housing 24 can be the clutch housing which is conventional for transmissions 12 and which is flanged accordingly to the housing of the internal combustion engine.

In the version according to FIGS. 2 and 3 there can likewise be a torsional vibration damping means or a ZMS which can be mounted accordingly in the conventional manner on the disconnect-type clutch 44. Alternatively the torsional vibration damping means or the ZMS can be located within the intermediate housing 54 and between the output shaft 20 of the differential 56 and the transmission-side transverse wall 58, as indicated by the broken lines in FIG. 2. The intermediate shaft 36' could be made in two parts for this purpose, with one shaft segment connected to the power delivery shaft 26 of the internal combustion engine 10, and one shaft segment connected to the rotor 18 via the plug connection 64; the two shaft segments would have to be pivot-mounted in one another similarly to FIG. 1.

The invention claimed is:

1. A drive train for a motor vehicle provided with an internal combustion engine, comprising:
   a first housing containing said engine;
   a second housing containing a transmission;
   a third housing interconnecting said first and second housings;
   an electric motor including a stator and a rotor disposed in one of said first and second housings, disposed coaxially relative to an output shaft of said engine;
   means for transferring torque from said engine output shaft to said rotor;
   a clutch selectively operable for transferring torque from said rotor to an input shaft of said transmission;
   a differential mounted in an exterior side of said third housing, having laterally protruding shafts connectable to a set of wheels, one of said laterally protruding shafts extending through said third housing, disposed below said means for transferring torque from said engine output shaft to said rotor; and
   means for transferring torque from said transmission to said differential.

2. A drive train according to claim 1 including torsional vibration dampening means disposed between said engine and said means for transferring torque from said engine output shaft and said rotor.

3. A drive train according to claim 2 wherein said dampening means comprises a dual mass flywheel with a primary mass attached to said engine output shaft, which flywheel is coupled to said means for transferring torque from said engine output shaft to said rotor by means of said dampening means and a disk-shaped drive member.

4. A drive train according to claim 1 wherein said rotor is journalled in a transverse wall of one of said second and third housings.

5. A drive train according to claim 1 wherein said rotor of said electric motor includes an annular portion comprising a base section of said clutch.

6. A drive train according to claim 1 wherein said means for transferring torque from said engine output shaft to said rotor is journalled in a transverse wall of one said second and third housings.

* * * * *